June 3, 1947.  D. T. SMOUT ET AL  2,421,723
WELDING ELECTRODE HOLDER
Filed June 14, 1945
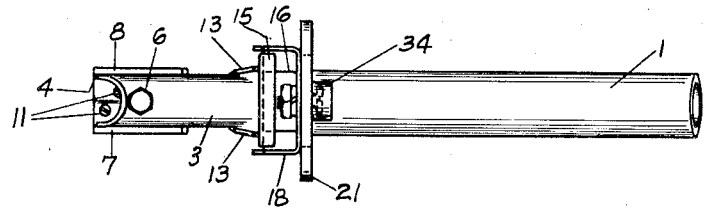
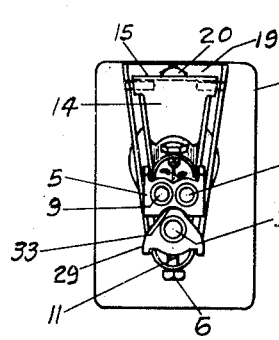 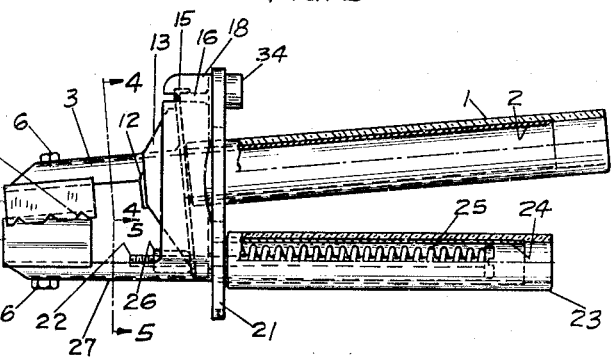
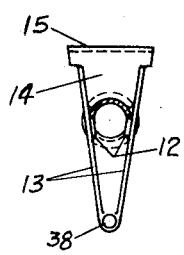 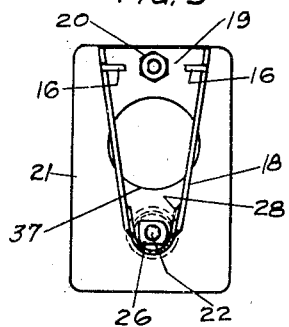 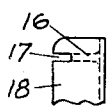
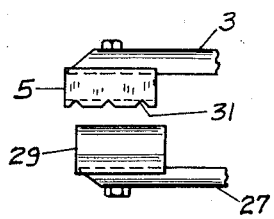 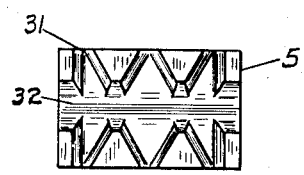
INVENTORS.
DONALD T. SMOUT &
BY DONALD D. SMOUT
A. D. T. Libby
Attorney Patented June 3, 1947

2,421,723

UNITED STATES PATENT OFFICE 2,421,723

WELDING ELECTRODE HOLDER

Donald Trentham Smout and Donald Dupree Smout, Darlington, England

Application June 14, 1945, Serial No. 599,424
In Great Britain January 20, 1944

11 Claims. (Cl. 219—8)

This invention relates to improvements in an electric arc-welding handle especially adapted for use for holding metallic electrodes.

It is one of the objects of our invention to provide a welding electrode handle having electrode-gripping or contact members to which the cable supplying the welding current can be directly attached, these contacts being readily separable from their support members for the purpose of making easy attachment of the current-conducting cable thereto.

Another object of our invention is to provide an electrode welding handle in which the electrode contacts are carried on support members in such a manner that they will not readily loosen, and hence will not be displaced from their electrode-engaging position.

Another object of our invention is to provide an electrode welding handle wherein the heat is generally confined at the electrode-gripping end, with a substantial air space to the rear of the electrode-gripping members and the parts adjacent the hand of the operator.

Another object of our invention is to provide a welding electrode handle, the tension of which can be quickly and easily adjusted, the tensioning device being spaced away from the electrode-gripping members.

A further object of our invention is to provide an electrode welding tool in which the handle portion is in two parts, one of which can be engaged by the thumb of the operator to help hold and balance the handle.

Another object of our invention is to provide a welding electrode handle which is so constructed that it will in practice; that is, with the cable attached thereto, automatically assume a position, on being laid down, such that the metal parts of the handle will not contact with the work or ground plate when no electrode is in the handle or when only a stub is left at the finish of an electrode.

Another object of our invention is to provide a welding electrode handle having relatively few but strong and substantial parts whereby the handle will stand a large amount of rough handling to which a handle of this type is subjected by a welding operator.

These and other objects will appear to one skilled in this art on reading the attached specification, wherein:

Figure 1 is a plan view of the handle on a reduced scale.

Figure 2 is a side elevation on a reduced scale of Figure 1, the two handle portions being shown in quarter section.

Figure 3 is a view of Figure 1, looking from left to right.

Figure 4 is a view on the line 4—4 of Figure 2, considering only the support member forming part of the upper handle portion.

Figure 5 is a view on the line 5—5 of Figure 2 with the upper handle support removed and showing only the support for the lower handle portion and the hand guard member.

Figure 6 is a detail of one of the frame supports.

Figure 7 shows a view similar to Figure 6, but of a modified form.

Figure 8 is a view of the electrode-gripping contacts in open position, ready to receive an electrode.

Figure 9 is a plan view of the electrode-gripping face of one of the contact members.

In the various views, wherein like numbers refer to corresponding parts, 1 is a tubular handle member of any suitable insulating material such as fibre. Within the insulating tube 1 is a metallic tubular shell 2 of any suitable material such as steel. This may be a seamless tube or it may be formed from a piece of sheet metal, and its extremity 3 has approximately one-half cut away so its edges are positioned in a shallow channel 4 of a contact member 5 that is held to the portion 3 by a screw stud 6. This construction provides side supports 7 and 8 for the edges of the portion 3, thereby relieving the stud 6 of all twisting strain. The contact member 5 may be readily removed from the portion 3 by removing the stud 6 so that the greater portion of the electrical cable which is inserted through the tube 2 can have the greater portion of its bared end inserted into the holes 9 and 10 and fastened thereto by a plurality of screws 11, only two of which are shown in Figure 1.

At the junction of the portion 3 and the body portion of the shell 2, downwardly extending flanges 12—preferably integral with the tube 2—are provided, one on each side of the portion 3, and these flanges 12 are fastened as by welding to oppositely disposed sides 13 of a member 14 which has a downwardly turned edge 15 pivotally mounted on lugs 16 that are positioned in slots 17 in side members 18 of a support plate 19 fastened by a screw, lock washer and nut, collectively referred to as 20, to a guard member 21 of suitable strong insulating material such as fibre, the head of the screw being positioned in the recess of an insulator 34.

The extremity of the member 14, distant from its pivot lugs 16, has a hole therein to receive an adjusting bolt 22 that is carried within a handle member 23 which also has a metallic shell 24 similar to 2. The shell 24 carries a tensioning spring 25 whose tension may be adjusted by the bolt 22 and a nut 26 that has its seat on the member 14.

The shell 24 has a portion 27 similar to 3 with oppositely disposed flanges 28 that are welded to the sides 13 of the plate 19. The portion 27 carries an electrode contact member 29 in the same manner as explained with respect to the contact member 5, the two being fastened together by the screw stud 6. The contact member 29, however, has only one hole 30 for receiving substantially one-third of the current-conducting cable which is fastened thereto by the same type of screws 11 as used in connection with the contact 5.

The contact member 5 is provided with a plurality of transversely positioned grooves 31 which are intercepted by a longitudinal groove 32 that is positioned to cooperate with the rounded surface 33 of the contact member 29. From Figure 9, it will be seen that the grooves at the opposite ends of the terminal contact 5 are arranged in such a manner that the bared end of the electrode will be forced into good gripping engagement between the contact members 5 and 29 by the tension of the spring 25 acting through the parts as described.

Since the contact member 5 is mounted so as to pivot about the lugs 16, it will be noted from Figures 2 and 3 that when no electrode is positioned between the contact members 5 and 29, they are in engagement at their outer extremity but do not come into contact at their rear extremity as indicated by the clearance at the rear transverse groove 31. By this construction, the welding handle is adapted to receive electrodes of different diameter, a small electrode being received at the outer extremity of the contacts 5 and 29, while electrodes of larger diameter are received in the grooves at the inner portion of the contact members 5 and 29.

While I have shown the handle member 1 and its cooperative tube 2 somewhat larger in diameter than the handle member 23 and its metallic shell 24, these may be of the same diameter, whereby the two metallic shells 2 and 24 may be made from the same tools, thereby being identical in construction, which will cheapen the cost of the manufacture of the handle. Also, I prefer to make the handle 1 from two to three inches longer than the handle 23 so that the welder, with his glove on, may slide his hand forwardly on the handle 1 toward the guard member 21 until his thumb will come under the handle 23 which will materially aid in supporting the handle in the hand of the operator so that he does not have to grip the handle 1 as hard as he would have to if he had no cooperative thumb support.

The handle being constructed as described, of an insulating tube and an inner metal tube preferably of steel, produces a structure which is light yet very strong and will stand a tremendous amount of abuse, so that the handle is as nearly indestructible as a welding handle can be made, and therefore possesses all the advantages pointed out in the early part of this specification.

Since the electrical cable is connected directly to the jaws or contact members, which are of a hard-wearing alloy of high conductivity, current is passed directly through the welding electrode as no other part of the holder carries current and the cable itself is protected in its long tubular housing. The grip on the electrode is easily and quickly adjusted by adjusting the tension of the spring 25, a light tension being used for small rods and a heavier tension for larger rods, this tension being readily adjustable by the bolt 22.

As will be seen from Figure 2, the tubular member 1, within which is carried the metal shell 2, passes through a hole 37 of the guard member 21 and abuts against the member 14. Consequently, to remove this unit of the holder, the bolt 22, which passes through a hole in the member 19 and a corresponding hole 38 in the member 14 for engagement with the nut 26, is removed and the support member 14, with its associated parts, may be readily removed from its assembled position.

While the member 14 is pivoted on lugs 16 which are separate pieces set into slots 17, the lugs 16 may be made integral with the side portion 18 of the member 19 by forcing the metal, as indicated at 35, into the position shown by the dotted line 36.

Other details may be varied without departing from the spirit of our invention or the scope of the appended claims.

What we claim is:

1. A holder for arc-welding electrodes, comprising a pair of metallic tubular members terminating in similarly formed ends with electrode-gripping contacts fastened to these ends, each tubular member having fastened thereto a support piece, one piece being pivotally mounted within and on the other, a bolt and cooperative spring carried in one of said tubular members and operatively connected to said pivoted piece, a guard member of insulating material fastened to the other of said pieces, and insulating tubes positioned over said metallic tubular members and extending at least up to the guard member.

2. A welding electrode holder as set forth in claim 1, further characterized in that said tubular members terminate in ends having the form of a sector of a circle with oppositely positioned edges while said electrode contacts each have a shallow channel along their length to non-rotatably receive said edges of said ends of the metallic tubular members.

3. A holder for arc-welding electrodes comprising a pair of metallic tubular members, a support for each of said members and to which each member is rigidly fastened, one support being pivoted on the other, said tubular members having ends extending beyond the supports with electrode contacts fastened thereto, a spring and adjusting bolt housed within the metallic tubular member fastened to the non-pivoted support, the bolt extending through this support into operative engagement with the pivoted support, a shield plate fastened to the non-pivoted support and insulators covering said metallic tubular members on the handle side of said shield plate.

4. An arc-welding electrode holder as set forth in claim 3, further characterized in that said tubular extending ends are substantially half-sections of the tubes, while the electrode contacts have longitudinal channels, the edges of said tube sections fitting against the sides of said channels.

5. An arc-welding electrode holder as set forth in claim 3, further characterized in that said supports for the metallic tubular members are generally triangular in shape and located one within the confines of the other.

6. An arc-welding electrode holder as set forth in claim 3, further characterized in that said supports for the metallic tubular members are generally triangular in shape and both have outwardly turned sides extending in the same direction, these sides being welded to their respective tubular ends.

7. An arc-welding electrode holder as set forth in claim 3, further characterized in that said supports for the metallic tubular members are generally triangular in shape and both have outwardly turned sides extending in the same direction, the metallic tubular members having flanges extending toward each other in pairs and positioned adjacent their respective sides of the supports and welded thereto.

8. An arc-welding electrode holder as set forth in claim 3, further characterized in that said supports for the metallic tubular members are generally triangular in shape and both have outwardly turned sides extending in the same direction, these sides being welded to their respective tubular ends, the sides of the non-pivoted support having inwardly projecting lugs, while the pivoted support has a downwardly turned edge to engage said lugs to pivot thereon.

9. A holder for arc-welding electrodes comprising a pair of handles, each consisting of a stiff metallic tubular member with a tube of insulating material thereover, a hand shield positioned over at least one of said tubes, a support fastened to said shield and also to one of said metallic tubular members, a support fastened to the other metallic tubular member and pivoted on the first-mentioned support, electrode-engaging contacts carried on the ends of said metallic tubular members and having means for connecting thereto a current cable coming through the pivoted handle, and a spring and adjusting bolt carried in the other handle and operatively connected to the pivoted support.

10. A holder for arc-welding electrodes as set forth in claim 9, further characterized in that the tubular handles project outwardly from the shield at a diverging angle and one handle is considerably longer than the other, whereby an operator, in using the holder, may slide his thumb under the shorter handle to assist in operating the handle.

11. A holder for arc-welding electrodes as set forth in claim 9, further characterized in that the tubular handles project outwardly from the shield at a diverging angle, the handle carrying the cable being longer than the other handle for the purpose described, the insulating tubes extending beyond the metallic tubular members so an operator's hand cannot contact with said members, while the guard member is of a size so that when the holder is laid down it will tilt on the guard so as to keep the electrode contact members out of engagement with the structure on which the handle may be placed.

DONALD TRENTHAM SMOUT.
DONALD DUPREE SMOUT.

REFERENCES CITED

The following references are of record in the file of this patent:

UNITED STATES PATENTS

| Number | Name | Date |
| --- | --- | --- |
| 2,067,995 | Varner et al. | Jan. 19, 1937 |
| 2,358,220 | Donnelly | Sept. 12, 1944 |
| 1,628,926 | Short | May 17, 1927 |
| 1,812,142 | Dieyer | June 30, 1931 |
| 1,839,500 | Rich | Jan. 5, 1932 |
| 1,851,039 | Fauseh et al. | Mar. 29, 1932 |
| 2,179,440 | Wagner | Nov. 7, 1939 |
| 2,186,158 | Weeks | Jan. 9, 1940 |
| 2,236,372 | Kotchi et al. | Mar. 25, 1941 |